C. McGREGOR.
AIR MOTOR.
APPLICATION FILED OCT. 25, 1909.
1,199,804.
Patented Oct. 3, 1916.
6 SHEETS—SHEET 6.
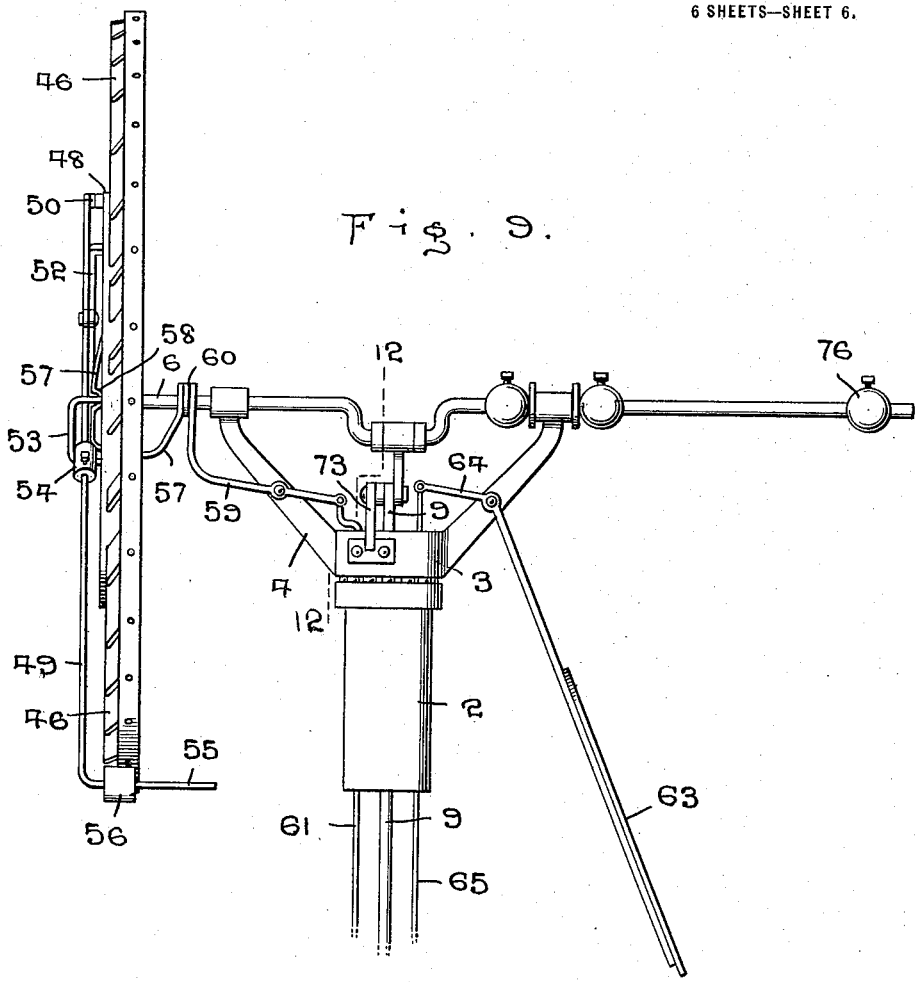
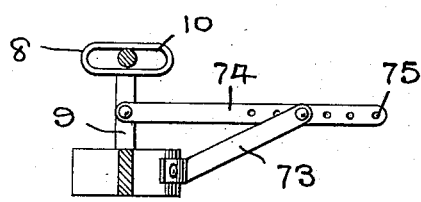
WITNESSES:
INVENTOR
Charles McGregor
BY Henry W. Blair
Attorneys

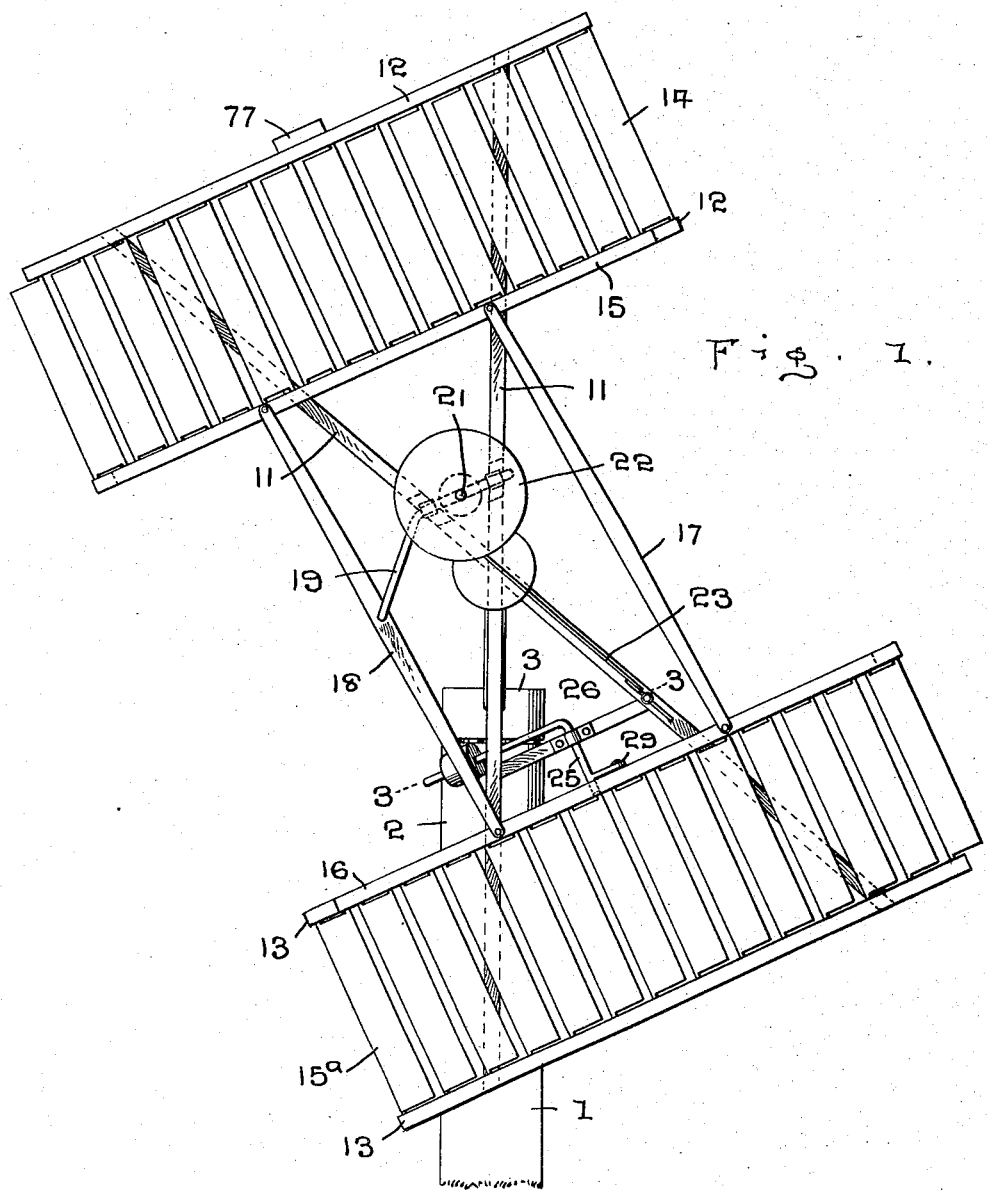

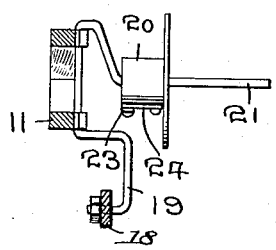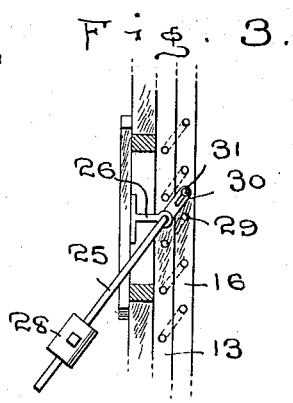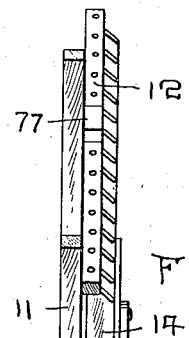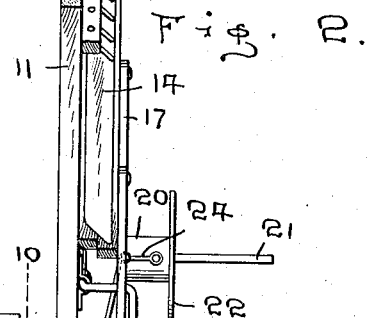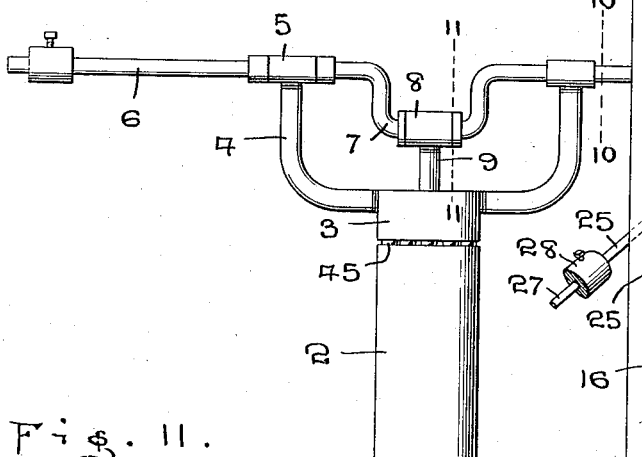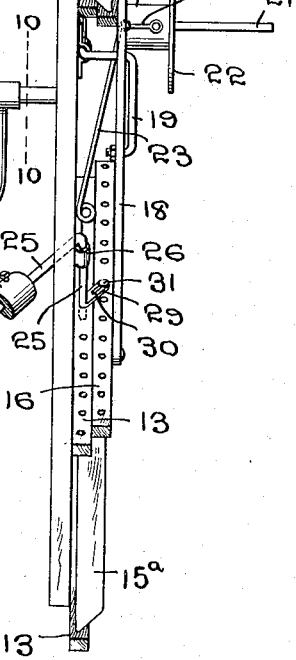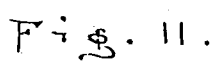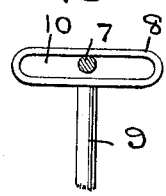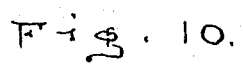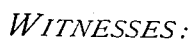

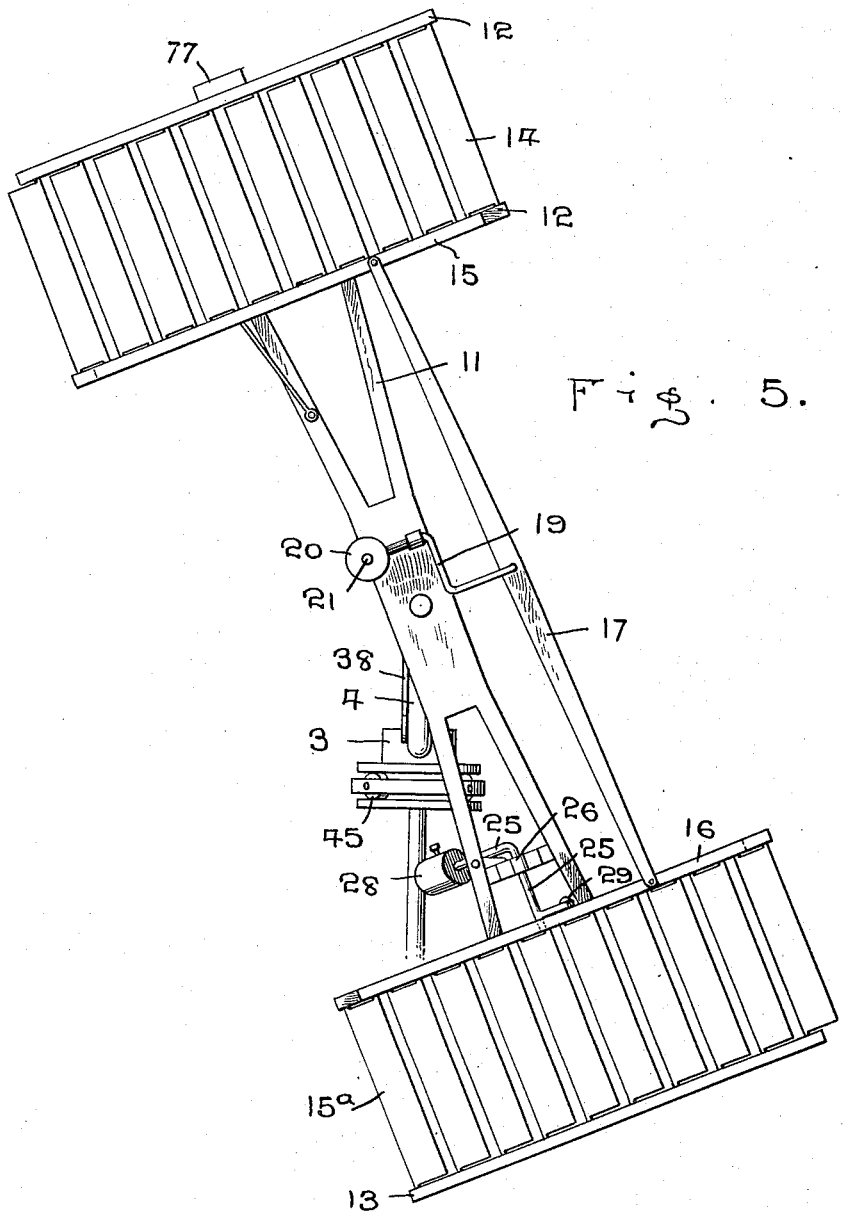

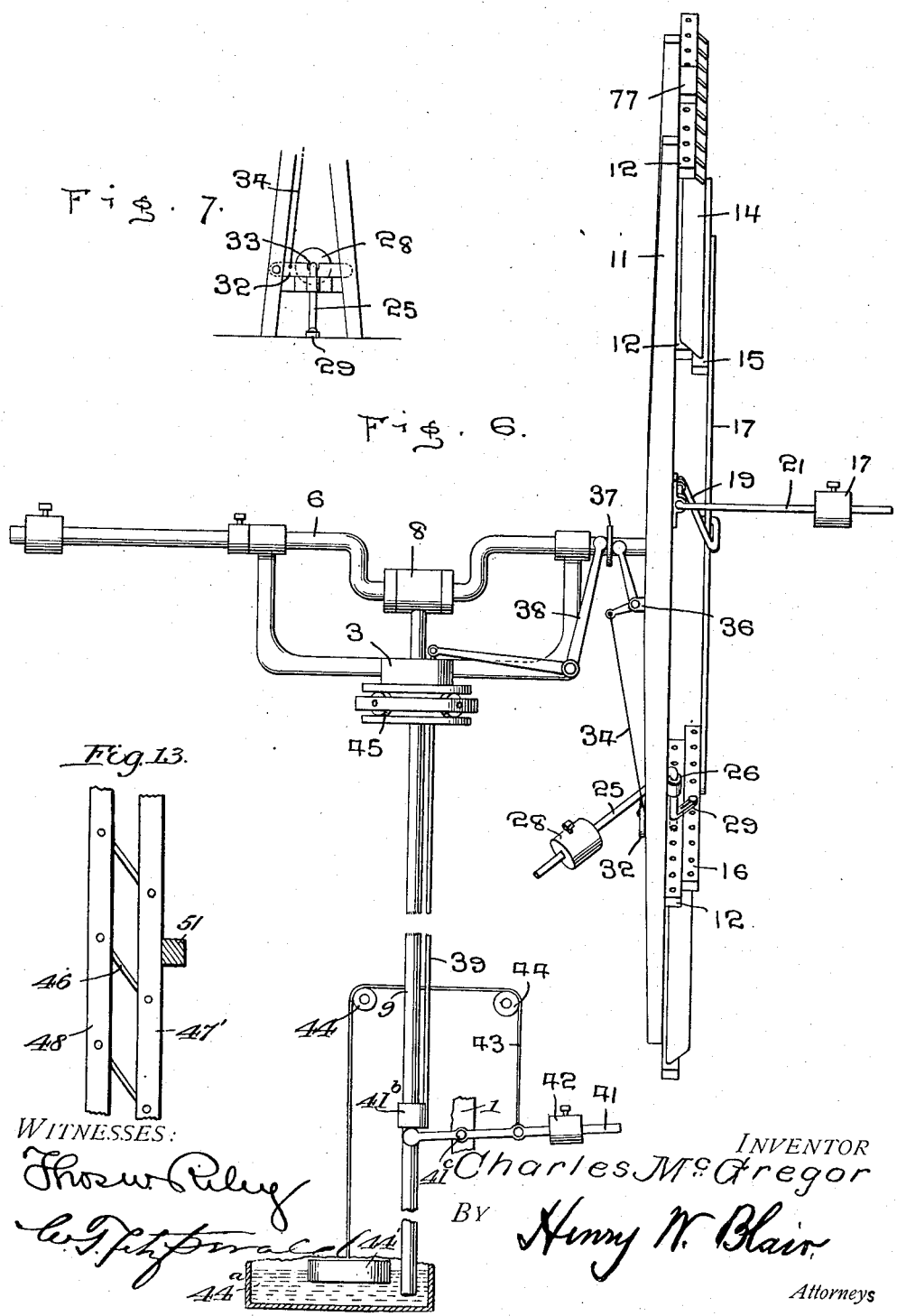

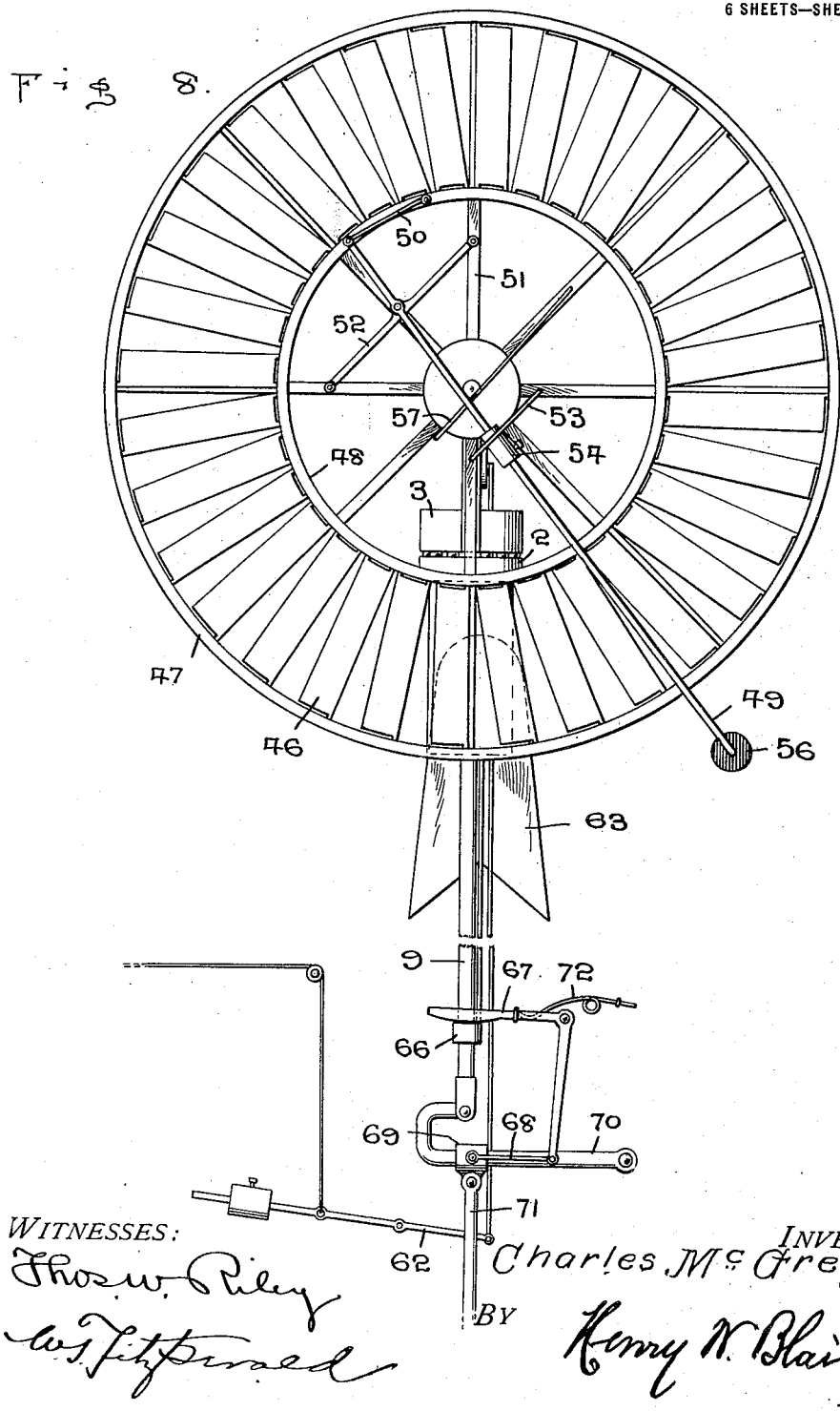

UNITED STATES PATENT OFFICE.

CHARLES McGREGOR, OF DERRY, NEW HAMPSHIRE, ASSIGNOR OF ONE-THIRD TO JOHN C. McGREGOR, OF NASHUA, AND ONE-THIRD TO HENRY W. BLAIR, OF MANCHESTER, NEW HAMPSHIRE.

AIR-MOTOR.

1,199,804.  Specification of Letters Patent.  Patented Oct. 3, 1916.

Application filed October 25, 1909. Serial No. 524,420.

*To all whom it may concern:*

Be it known that I, CHARLES McGREGOR, a citizen of the United States, residing at Derry, in the county of Rockingham and State of New Hampshire, have invented certain new and useful Improvements in Air-Motors; and I do hereby declare the following to be a full, clear, and exact description of the invention, such as will enable others skilled in the art to which it appertains to make and use the same.

My invention relates to new and useful improvements in motors of that class adapted to be operated by air and is more particularly an improvement over my former Patent No. 717110, dated Dec. 30, 1902, and my object is to provide a device of this class which will be operated with a minimum amount of air pressure.

A further object is to provide means for employing the reciprocating movement of a crank shaft for operating the object to which the motor is attached.

A further object is to provide suitable sails for rocking the crank shaft to operate the parts to which the shaft is connected.

A further object is to provide means for automatically shifting the positions of the sail blades, whereby the sails will be caused to swing back and forth in the arc of a circle.

A further object is to provide means for automatically increasing or decreasing the stroke of the sails.

A further object is to arrange the parts of the motor so that the sails will act as a vane for bringing the motor in position to properly receive the pressure of the wind or air thereon.

A still further object is to provide means for automatically setting the sail blades in a predetermined position and stop the operation of the motor.

A further object is to provide means for increasing the stroke of the piston when the pressure of the wind on the motor is increased and a further object is to provide a suitable balance weight whereby the weight of the parts operated by the motor will be compensated for and the sails held in position to be operated by the pressure of the wind at all times.

Other objects and advantages will be hereinafter referred to and more particularly pointed out in the claims.

In the accompanying drawings forming part of this application, Figure 1 is an elevation of the motor in its operative position. Fig. 2 is a side elevation thereof. Fig. 3 is a sectional view as seen on line 3—3, Fig. 1. Fig. 4 is a detail plan view partly in section of an auxiliary sail employed for increasing the stroke of the motor. Fig. 5 is an elevation of a slightly modified form of motor. Fig. 6 is a side elevation thereof. Fig. 7 is a detail view showing the mechanism for stopping the operation of the motor. Fig. 8 is another modified form, shown in elevation. Fig. 9 is a side elevation thereof. Fig. 10 is a detail sectional view as seen on line 10—10, Fig. 2. Fig. 11 is a detail sectional view as seen on line 11—11, Fig. 2. Fig. 12 is a detail sectional view as seen on line 12—12, Fig. 9, and Fig. 13 is a detail plan view partly in section showing the coöperating blade holding rings used in that form of structure shown in Figs. 8 and 9.

Referring to the drawings in which similar reference numerals designate corresponding parts throughout the several views, 1 indicates a post or support for my improved motor, which may be constructed in the usual or any preferred manner and mounted upon said post is a tubular section 2, which section is secured to the post in any preferred manner.

Rotatably mounted upon the upper end of the tubular section 2 is a circular body portion 3 of a yoke 4, the upper ends of said yoke having box bearings 5 through which extends an oscillatory shaft 6, that portion of the shaft on axle between the bearings 5 having a crank 7, to which is attached a head 8 of a pump or piston rod 9, said head 8 being preferably oblong and provided with an oblong slot 10, through which the crank portion of the shaft 5 extends.

By means of a vane, (to be hereinafter described), the axle 8 is caused to normally lie in the direction of and in alinement with the wind current, and it is obvious that as the shaft rotates it rolls from one side to another of the box bearings 5, thereby performing a rotary or oscillatory motion and, at the same time, a reciprocatory motion laterally.

Attached to one end of the shaft 6 is a pair of crossed arms 11, to the outer ends of which are secured bars 12 and 13, said bars being arranged in pairs at the upper and lower ends of said crossed arms, respectively, and between each set of arms are pivotally mounted a plurality of blades 14 and 15ª, the inner ends of said blades being pivotally attached to thrust bars 15 and 16, respectively, said thrust bars being employed for changing the angles of said blades, with respect to the wind, the bars 12 and 13 and the blades 14 and 15ª forming sails which are adapted to be operated by the force of the wind to raise and lower the piston rod.

Pivotally connecting the thrust bars 15 and 16 are links or presser bars 17 and 18, the link 18 being pivotally mounted at its longitudinal center to a controlling lever 19, which lever is pivotally mounted upon the crossed arms 11 at a point above their axial centers, the end of the lever engaging the link at a point below its pivotal connection with the crossed arms, whereby when a weight 20 is mounted upon the horizontal shank 21 of said lever, inward pressure will be directed against said link 18, which will result in retarding the endwise movement of said thrust bars, because of the counteracting influence of the blades 14 and 15ª; it being obvious that said bars must be forced outward against the action of the weight 20 before they can move endwise. By thus retarding the movement of the thrust-bars, the movement of the blades is retarded at the start of their shifting motion and accelerated toward the finish thereof, thereby insuring their quick and positive change from one to the other of their two extreme positions.

The weight 20 is slidably mounted upon the shank 21 and is provided on its outer end with a sail 22, so that when the velocity of the wind increases, the pressure of the wind on the sail will move the weight outwardly on the shank 21 and thereby increase the pressure against the link 18.

The weight 20 is normally held adjacent the pivoted end of the shank 21 by means of a spring 23, one end of the spring being attached to one of the crossed arms, while the opposite end thereof is attached to a link 24, pivoted to the weight 20 and it will be readily seen that as soon as the pressure of the wind on the sail has decreased, the tension of the spring will move the weight inwardly on the shank.

The blades 14 and 15ª are disposed at an angle to the trend of the wind when the motor is in operation and to facilitate the pendulum action of the sails, one set of the blades is positioned at one angle and the other set at an opposite angle and in order to shift said blades back and forth to change the angles thereof and cause the sails to swing in the arc of a circle, a shifting rod 25 is provided, the lower end of the vertical portion thereof being pivoted to the inner bar 13, while the upper end of the vertical portion extends through a bearing 26 carried by the crossed arms, the upper end of the vertical portion terminating in a horizontal shank 27, upon which is adjustably mounted a counter weight 28 and when the lower sail has swung to either side of the vertical, the shank 27 will swing by gravity and rotate the vertical portion of the shifting rod.

The lower end of the vertical portion of the shifting rod is provided with a foot piece 29, through which is extended a slot 30 and through said slot is introduced a pin 31, said pin entering the thrust bar 16 and it will be readily seen that when the shifting rod is rotated, and the foot piece 29 swung in the arc of a circle, the thrust bar 16 will be moved lengthwise and the angle of the sails changed.

The thrust bar 15 is likewise moved longitudinally by pivoting the link 18 at its longitudinal center to the controlling lever 19, so that when the thrust bar 16 is moved lengthwise in one direction, the link 18 will be rocked on the controlling lever 19 and the thrust bar 15 moved longitudinally in a direction opposed to the movement of the bar 16.

Should it be desired to stop the motor, the blades are to be brought directly into the wind edgewise so that the wind will blow directly through the sails without operating the same and to accomplish this result, a latch 32 is attached at one end to one of the crossed arms and is passed below the shank of the shifting rod 25, said latch having a notch 33 at its longitudinal center in which the shank 27 is adapted to be seated when the free end of the latch is elevated, thereby holding the shifting rod against swinging movement.

The free end of the latch is elevated by attaching thereto a cable 34, the upper end of the cable being secured to a bell crank lever 35, which lever is pivoted between ears 36 on one of the crossed arms 11, the upper arm of the bell crank lever being preferably bifurcated and positioned astride the shaft 6, said shaft having a sliding collar 37 thereon, against which the upwardly extending arm of a bell crank lever 38 is adapted to press, said bell crank lever being pivoted to one of the arms of the yoke and having its horizontal arm extended over the body 3 of the yoke.

A rod 39 is attached to the horizontal arm of the bell crank lever 38 and extends downwardly through the body 3 and tubular section 2, the lower end of said rod having a collar 41 which surrounds the piston rod 9 and it will be readily seen that by giving an upward thrust on said rod 39, the vertical arm of the bell crank lever 38 will be swung outwardly, thereby pressing the collar 37 against the vertical arm of the bell crank lever 35, swinging said lever on its pivot and raising the latch 32 so that when the shifting rod 25 swings to a position at right angles to the longitudinal trend of the sails, said shifting rod will engage the notch and thus hold the shifting rod from operating the blades of the sails.

The rod 39 is automatically operated by means of a lever 41, which is pivoted at 41$^c$ to the post 1 and has its inner end positioned below the collar 41$^b$, so that by directing a downward movement on the free end of the lever, the rod 39 will be moved upward and if desired, a weight 42 may be adjustably mounted on said lever.

The lever 41 is normally held in an elevated position by means of a cable 43, said cable being supported by sheaves 44 from which it extends downwardly and connects with a float 44′; said float being located in a tank or well 44$^a$, in which the water supports said float, the level of the water in the tank or well being regulated or varied by the action of the pump. The float 44′ is sufficiently heavy to support the weight 42 in elevated position. However, when the water in the tank 44$^a$ rises sufficiently, the weight 42 descends, allowing the lever 42 to move on its pivotal point 41$^c$, so that the rod 39 is raised, through the medium of the sleeve 41$^b$, so that the latch 32 is raised, through the medium of the members 34, 37, 38 and 39, and the arm 25 is then engaged by the notch 33 of said latch, and the operation of the motor is thereby stopped.

By providing the head 8 with the elongated slot 10, it will be readily seen that the piston will be elevated without unduly swinging the piston out of vertical alinement and without affecting the reciprocation of the crank extending through said slot and in view of the oblong opening in the box bearings 5, the shaft 6 will have a rolling movement in said bearings, as well as a rotating movement in view of which the wear on the shaft and parts through which it is introduced will be limited to a minimum and this movement also brings the crank 7 in better position to raise the piston with less power than if the shaft 6 is held against rolling movement.

The body 3 of the yoke may be mounted upon a plurality of bearing balls or rollers 45, whereby the body and the yoke may readily swivel on the upper end of the tubular section.

In that form of construction shown in Figs. 5 and 6, the sail 22 is dispensed with although it will be understood that said sail may be readily applied and in these views I have also shown that but one of the links for connecting the thrust bars of the sails, the operation of the two forms being identical.

In Figs. 8 and 9 I have shown my improved device applied to use on a motor having a circular wheel, the blades 46 thereof being pivotally secured to two concentric rings 47 and 47′, while the outer edges of the inner ends are pivotally connected to a band 48, which band is employed for shifting the angles of said blades.

The band 48 is given a rotating movement through the medium of a pendulum 49, the upper end of said pendulum being secured to the band 48 by means of a pitman 50, while the pendulum is pivotally attached to the frame 51 employed for supporting the ring 47 and blades therein and at a point adjacent the upper end of the pendulum, a cross bar 52 being provided to which the pendulum is pivotally attached.

The pendulum is extended through a guard 53, which is also attached to the frame 51, said guard limiting the swinging movement of the pendulum and in order to regulate the swinging action of the pendulum, a sliding weight 54 is adjustably mounted thereon and by moving the weight upwardly or downwardly, on the pendulum, the stroke thereof will be accordingly increased or decreased.

The lower end of the pendulum extends beyond the periphery of the outer ring 47 and is provided with a right angled extension 55, upon which is adjustably mounted a weight 56, said weight being also employed for controlling the swinging movement of the pendulum.

By providing the pendulum and arranging the blades in the manner shown, the wheel will be rotated back and forth instead of making a complete rotation, thus obtaining the same action upon the piston and shaft for operating the same as when the sails are used.

When it is desired to stop the operation of the wheel, the blades are turned directly into the wind edgewise as in the other construction and the swinging motion of the pendulum is stopped by providing a catch 57, one end of which is fixed to the frame 51 and the opposite end thereof extended in the path of the pendulum and thence inwardly and around the shaft 6, that portion of the catch adjacent the longitudinal center of the stroke of the pendulum having a notch 58 formed therein, in which the pendulum is adapted to be seated, when an outward movement is given the free end of the catch, thus holding the pendulum against further swinging movement.

The catch 57 is operated through the medium of a lever 59, one end of which is positioned to engage the edge of the catch surrounding the shaft 6, while the opposite end thereof is extended over the body of the yoke 4, said lever in its length being pivotally attached to one of the arms of the yoke, whereby when the inner end of the lever is raised or lowered, the outer end will be moved outwardly or inwardly and to insure a positive connection between the meeting ends of the catch and lever, a washer 60 is positioned between said ends and around the shaft 6, the washer forming a bearing surface for the meeting ends of the catch and lever.

The inner end of the lever 59 has attached thereto a rod 61, to the lower end of which is attached a lever 62, which lever is pivoted to the supporting post as in the former construction.

In the construction shown in Figs. 1 to 7, the stroke of the piston is increased by retarding the swinging movement of the shifting rod 25, thereby holding the blades at an angle a greater length of time and causing the sails to describe a greater circle, but in that form of device shown in Figs. 8 and 9, a vane 63 is pivotally secured to one of the arms of the yoke 4 and depends therefrom at an angle, the inner end of the arm 64 of the vane having attached thereto a rod 65, which rod is extended downwardly through the body 3 and tubular section 2 and is connected at its lower end to a collar 66, which collar surrounds the pitman 9.

Disposed above the collar is one arm of a bell crank lever 67, the opposite arm of said bell crank lever having a link 68 attached thereto, which link engages a sliding coupling 69, said sliding coupling being mounted upon an arm 70, one end of the arm being pivotally attached to the post 1, at 70' while the opposite end thereof is extended upwardly and inwardly and connected to the lower end of the pitman 9, whereby when the pitman is moved upwardly and downwardly, the arm 70 will be likewise swung upon its pivot to operate the pump rod 71, which is pivotally attached at 69' to the coupling 69.

As the bell crank lever 67 is pivoted to the support 1, it will be readily seen that when the velocity of the wind is such as to move the vane inwardly or toward the tubular section 2, the collar 66 will be elevated, thus swinging the bell crank lever 67 on its pivot and moving the coupling and pump rod toward the outer end of the arm 70, thus increasing the length of the stroke of the pump rod, but maintaining the speed of the stroke substantially the same as when the motor is operating at its normal capacity. As soon, however, as the velocity of the wind decreases, the vane 63 will assume its normal upward position and lower the collar 66 whereupon a spring 72 will direct pressure on the horizontal arm of the bell crank lever 67 and move the coupling toward the pivoted end of the arm 70, thereby decreasing the length of the stroke of the pump rod and increasing the number of the strokes.

When the head 8 is pivoted to the pitman 9 as shown in Figs. 9 and 12, a bracket 73 is attached to the body 3, and extending between said bracket and pivotal connection between the head and piston is a bar 74, said bar having a plurality of openings 75 therein whereby it may be longitudinally adjusted to the bracket 73, thereby shifting the position of the piston to accommodate the same to longer or shorter strokes and it will further be seen that by providing the bar 74, said piston will move in substantially a vertical plane at all times, the arc of the circle described by swinging the end of the bar being very slight.

As shown in Figs. 1 to 7, there are two sails provided for the crank, but it will be readily understood that any number of the sails may be used or placed in a complete circle as shown in Figs. 8 and 9 and by providing the sails in this manner, the blades will act as a vane to keep the sails in the wind and by providing a suitable counter weight 76 for the free end of the shaft 6, the shaft will always run true.

A certain air pressure is required to operate the sails and as the weight of the piston and parts attached thereto is directed on the crank of the shaft 6, when said crank is on its upward stroke, I have provided means for minimizing or compensating for said additional weight by providing at the longitudinal center of the upper sail a counter balance 77, the weight of which is equal to the added counterbalancing effect of the piston and parts attached thereto and by raising the counter balance a distance from the surface of the bar 12, said counter balance will have greater effect and will compensate for the increasing of the length of the piston should such be necessary.

As an illustration of the effect of the counter balance 77, it will be assumed that it requires two pounds pressure of wind to operate the sails and should the piston and parts attached thereto add an additional pound of weight, it would require three pounds pressure of wind to move the piston on its up stroke, thus causing the sails to swing unevenly, but by providing the counter balance 77, said counter balance will compensate for the weight of the piston and cause the sails to swing at a uniform stroke throughout their length and should the length of the piston be increased, the counter balance is to be adjusted upwardly from the sail, thereby adding a sufficient degree of momentum to compensate for the added weight of the piston. The counter balance also serves to hold the sails at an angle to the horizontal when said sails are inoperative, the object of such being to maintain the shifting rod at such a position that when released from its latch, the weight thereon will cause the shifting rod to swing laterally and immediately dispose the blades at an angle to the trend of the wind.

It will thus be seen that I have provided a very cheap and economical form of motor and one that will be positive in its operation.

It will further be seen that by arranging the sails in the manner shown, but a minimum amount of air pressure will be required to operate the motor.

It will further be seen that by arranging the shaft 6 to move laterally in its bearings while said shaft is in operation, wear or friction on said shaft will be reduced to a minimum and further lateral movement of the shaft will cause the crank to give a direct lift on the head and thus eliminate the tendency to swing the head laterally when the crank makes its stroke.

It will further be seen that by providing means for automatically directing pressure on the links or spring bars extending between the thrust bars, the swinging movement of the shifting rod will be retarded, thus causing the sails to swing in a greater arc, thereby maintaining substantially the same number of strokes of the piston in a strong wind as when the motor is operating in a light wind, although the length of the stroke will be increased. This construction is a very important one, as were no means provided for automatically increasing the swinging stroke of the sails, the motor and parts operated thereby would be severely strained, if not destroyed by the rapid action of the sails in an unusually strong wind, but by increasing the length of the stroke, the number of strokes will be substantially the same as when the sails are operating in a light wind and making shorter strokes.

In addition to providing automatic means for controlling the operation of the motor, it will be readily seen that by mounting the operating shaft in the manner shown, friction will be substantially eliminated, the parts requiring no oil to prevent wearing thereof and it will likewise be seen that by providing the counter balance for the upper sail and positioning the same as shown lifting power will be added to the sail so that the motor will operate in a very light wind and further said counter balance will maintain the sails in position to always operate to set the sails in motion when the blades of the sail are disposed at an angle to the trend of the wind.

What I claim is:

1. In a motor of the class described, the combination with a driving shaft; of a pair of sail frames carried by said shaft, blades pivotally secured to the sail frames, thrust bars connected to said blades and adapted to swing the same, a shifting rod connected to said thrust bars, a means coacting with shifting-rod and thrust-rod for shifting the blades, and means for retarding and accelerating the shifting motion of said blades at the start and finish thereof respectively.

2. In a motor, the combination with a shaft; of a pair of bars carried by said shaft, sails carried by said bars, a plurality of blades carried by each sail, thrust bars adapted to dispose said blades at an angle to the trend of said shaft, a shifting rod adapted to move said thrust bars lengthwise, means connecting the upper and lower thrust rods adapted to dispose the blades on the upper sail at an angle opposite to the angle of the blades on the lower sail and means to direct inward pressure on said connecting means whereby the operation of the shifting rod will be retarded.

3. In a motor of the class described, the combination with a shaft, sails carried by said shaft, said sails having a plurality of blades and swinging means adapted to change the angles of said blades; of a latch adapted to engage said shifting means and hold the same against operation and means to automatically elevate said latch relative to the shaft and engage the same with the shifting means.

4. In a wind motor, the combination of an oscillatory shaft, the axis of which is alined with the wind current and which moves in a horizontal plane as the shaft oscillates, sails connected to said shaft, and means for shifting the position of certain of said sails whereby the sails will swing back and forth on said axis, and means coöperatively connected with said sails for increasing the swing thereof.

5. The combination in a current operated motor and an element to be operated thereby, of an oscillatory axle mounted to reciprocate laterally on a horizontal plane and normally lying in alinement with the direction of the current, movable blades connected with and supported by the axle and adapted to be oscillated therewith by the action of the current, means associated with the blades whereby the position of each is changed relative to said current and thereby coacting with the current for causing said axle to oscillate and reciprocate laterally for actuating said element.

In testimony whereof I have signed my name to this specification in the presence of two subscribing witnesses.

CHARLES McGREGOR.

Witnesses:
MARY A. WHEELER,
AMBROSE B. PILLSBURY.

Copies of this patent may be obtained for five cents each, by addressing the "Commissioner of Patents, Washington, D. C."